US008930919B2

(12) United States Patent
Bhaskara et al.

(10) Patent No.: US 8,930,919 B2
(45) Date of Patent: Jan. 6, 2015

(54) MODERNIZATION OF LEGACY SOFTWARE SYSTEMS BASED ON MODELED DEPENDENCIES

(71) Applicant: The Boeing Company, Chicago, IL (US)

(72) Inventors: Sreeram Bhaskara, Redmond, WA (US); Gargi Chakraborty, Redmond, WA (US)

(73) Assignee: The Boeing Company, Chicago, IL (US)

( * ) Notice: Subject to any disclaimer, the term of this patent is extended or adjusted under 35 U.S.C. 154(b) by 181 days.

(21) Appl. No.: 13/626,333

(22) Filed: Sep. 25, 2012

(65) Prior Publication Data

US 2014/0089888 A1 Mar. 27, 2014

(51) Int. Cl.
*G06F 9/45* (2006.01)

(52) U.S. Cl.
USPC ............................ 717/137; 717/104; 717/143

(58) Field of Classification Search
CPC ......................................................... G06F 8/51
USPC .................................. 717/104–109, 136–178
See application file for complete search history.

(56) References Cited

U.S. PATENT DOCUMENTS

| 5,675,801 | A | * | 10/1997 | Lindsey | 717/108 |
| 5,790,861 | A | * | 8/1998 | Rose et al. | 717/145 |
| 6,002,874 | A | * | 12/1999 | Bahrs et al. | 717/157 |
| 6,526,569 | B1 | * | 2/2003 | Obin et al. | 717/140 |
| 7,047,524 | B1 | * | 5/2006 | Braddock, Jr. | 717/136 |
| 7,240,338 | B1 | * | 7/2007 | Bell et al. | 717/137 |
| 7,318,216 | B2 | * | 1/2008 | Diab | 717/108 |
| 7,966,356 | B2 | | 6/2011 | Sangal et al. | |
| 2003/0226132 | A1 | | 12/2003 | Tondrueau et al. | |
| 2012/0151437 | A1 | * | 6/2012 | Kneisel et al. | 717/114 |

OTHER PUBLICATIONS

Rahgozar, Maseud, and Farhad Oroumchian. "An effective strategy for legacy systems evolution." Journal of Software Maintenance and Evolution: Research and Practice 15.5 (2003), pp. 325-344.*
Serrano, Miguel A., Doris L. Carver, and Carlos Montes de Oca. "Reengineering legacy systems for distributed environments." Journal of Systems and Software 64.1 (2002), pp. 37-55.*
Zou, Ying, and Kostas Kontogiannis. "Migration to object oriented platforms: A state transformation approach." Software Maintenance, 2002. Proceedings. International Conference on. IEEE, 2002, pp. 1-10.*
Baxter, Ira D., Christopher Pidgeon, and Michael Mehlich. "DMS®: Program transformations for practical scalable software evolution." Proceedings of the 26th International Conference on Software Engineering. IEEE Computer Society, 2004, pp. 1-10.*
Thiran, Philippe, et al. "Wrapper-based evolution of legacy information systems." ACM Transactions on Software Engineering and Methodology (TOSEM) 15.4 (2006), pp. 329-359.*

(Continued)

*Primary Examiner* — Satish Rampuria
(74) *Attorney, Agent, or Firm* — Hope Baldauff LLC (57) ABSTRACT

Methods, systems, and computer-readable media are described herein for migrating a non-object-oriented application to an object-oriented platform. The non-object-oriented application may be received. The non-object-oriented application may be parsed into elements of the non-object-oriented application. A design structure matrix (DSM) representation of the elements may be generated. A final object model may be generated based on the DSM representation. The final object model may be mapped to a code skeleton representation of an object-oriented development environment.

15 Claims, 11 Drawing Sheets

(56) References Cited

OTHER PUBLICATIONS

PCT International Search Report and Written Opinion dated Dec. 10, 2013 in PCT/US2013/054485.
Pidaparthi, Sagar, et al., "Resource Usage Matrix in Object Identification and Design Transformation of Legacy Procedural Software", 1997, pp. 1-12.
Sangal, Neeraj, et al., Using Dependency Models to Manage Complex Software Architecture, Oct. 16, 2005, pp. 167-176.
Zou, Ying, et al., "Incremental Transformation of Procedural Systems to Object Oriented Platforms", Nov. 3, 2003, pp. 290-295.
Czibula, Istavan Gergely, "A Clustering Approach for Transforming Procedural to Object-Oriented Software Systems", Jul. 2-4, 2009, pp. 185-188.
De Lucia, et al., "Migrating Legacy Systems Towards Object-Oriented Platforms", Oct. 1, 1997, pp. 122-129.
Lattix. Version 7.3 (Software) [http://www.lattix.com/] Printed Jul. 20, 2012, pp. 1-1.
Understand Source Code Analysis & Metrics. Version 2.6 (Software) [http://www.scitools.com/download] Originally printed Jul. 20, 2012. Reprinted Sep. 25, 2012.
Sudhakar, P. et al., "Reengineering Legacy to Modern System with One Time Checker for Information System Evolution," American Journal of Applied Sciences 9 (6): 832-841, 2012.
Subramaniam, G.V. et al., "Deriving an Object Model from Legacy Fortran Code," IEEE 1063-6773/96, 3-12. 1996.
Bhaskara, S., "Re-Engineering Legacy Knowledge Based Engineering Systems Using DSM," 10th International Design Structure Matrix Conference, DSM'08, Nov. 2008.

\* cited by examiner

MODERNIZATION OF LEGACY SOFTWARE SYSTEMS BASED ON MODELED DEPENDENCIES

BACKGROUND

FORTRAN (FORmula TRANslation) is a procedural programming language well-suited for performing large, complex numerical and scientific computations. Since the introduction of FORTRAN in the 1950s, many systems of varying size and complexity have been developed using FORTRAN. Some of these systems may be decades old and may still be in active use in various industries. As a result, these systems may be referred to as legacy FORTRAN systems.

Legacy FORTRAN systems can suffer from various drawbacks. First, a legacy FORTRAN system may have little or no documentation. Second, a legacy FORTRAN system may be developed using outdated software design methodology or no software design methodology at all. Third, multiple programmers may have worked on a legacy FORTRAN system, thereby creating code having multiple and sometimes disparate programming styles. Fourth, new college graduates currently entering the workforce may have received little or no formal training in legacy programming languages, such as FORTRAN, thereby reducing the amount of skilled programmers who can work on a legacy FORTRAN system. Such drawbacks and others can affect an organization's ability to maintain, migrate, and/or modernize legacy FORTRAN systems.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media are described herein for migrating a non-object-oriented application to an object-oriented platform. According to embodiments presented herein, the non-object-oriented application may be received. The non-object-oriented application may be parsed into elements of the non-object-oriented application. A design or dependency structure matrix (DSM) representation of the elements may be generated. A final object model may be generated based on the DSM representation. The final object model may be mapped to a code skeleton representation of an object-oriented development environment.

The features, functions, and advantages discussed herein can be achieved independently in various embodiments of the present invention or may be combined in yet other embodiments, further details of which can be seen with reference to the following description and drawings.

DETAILED DESCRIPTION

The following detailed description is directed to methods, systems, computer-readable media, and other suitable technologies for migrating a legacy software application, such as a FORTRAN application, to a modern, object-oriented platform. According to various embodiments, the technologies may be configured to perform a three-stage migration process. In the first stage, the technologies may be configured to receive a source application, extract elements of the source application, capture dependencies between the elements, and generate a design or dependency structure matrix (DSM) representation that graphically depicts the extracted elements and their captured dependencies. In the second stage, the technologies may be configured to perform an analysis on the DSM representation to generate a modular framework of the source application. Some example analyses may include domain knowledge independent analysis and functional knowledge analysis. In the third stage, the technologies may be configured to generate a code skeleton in an objected-oriented target system based on the modular framework. The code skeleton may be utilized by a programmer to effectively and efficiently translate the source application from its source language (e.g., FORTRAN) to an object-oriented target language (e.g., JAVA).

Generally, DSM is a compact and simple visual representation of a complex system. Analysis techniques using DSM may be utilized to model a system in order to solve decomposition and integration problems. According to various embodiments, a DSM used for software analysis is an n×n square matrix where diagonal cells represent the system's nodes or modules. Each diagonal cell may be associated with a numeric weight that represents a percentage of code that the corresponding node comprises with respect to the whole system. All other cells in the matrix may represent potential dependencies or relationships between the group of elements or modules indicated by shaded (or otherwise highlighted) and/or numerically weighted cells that are off the diagonal.

For purposes of illustration, embodiments described herein primarily refer to the migration of a legacy FORTRAN application to a modern, object-oriented platform. However, it should be appreciated that such embodiments are merely examples and are not intended to be limiting. In particular, the concepts and technologies described herein may be similarly utilized for the modernization of applications written in other legacy programming languages (e.g., LISP, COBOL, etc.).

In the following detailed description, references are made to the accompanying drawings that form a part hereof and that show, by way of illustration, specific embodiments, or examples. In referring to the drawings, like numerals represent like elements throughout the several figures.

Figure 1:
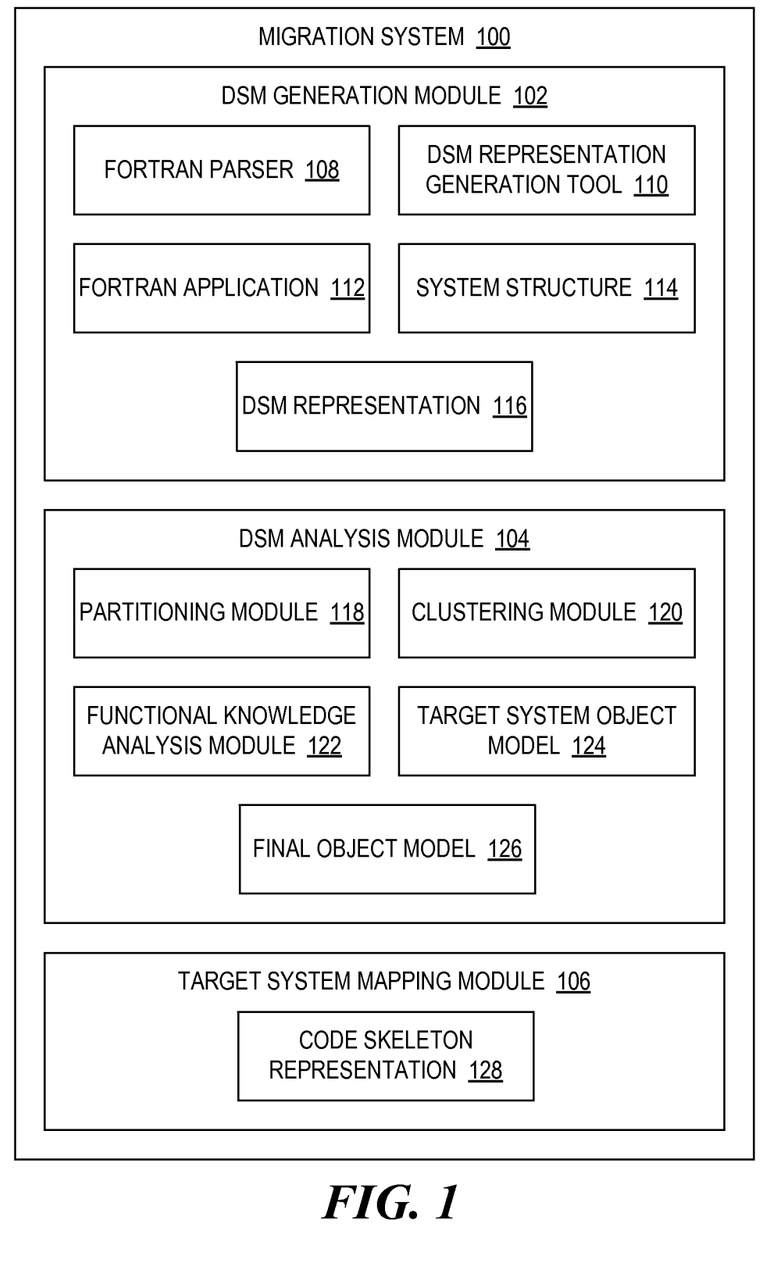
FIG. 1 is a block diagram illustrating a migration system configured to migrate a source application to an object-oriented platform, in accordance with embodiments presented herein.

FIG. 1 is a block diagram illustrating a migration system 100 configured to migrate a source application to an object-oriented platform, in accordance with embodiments presented herein. The migration system 100 may include a DSM generation module 102, a DSM analysis module 104, and target system mapping module 106.

The DSM generation module 102 may include a FORTRAN parser 108 and a DSM representation generation tool 110. An example of the FORTRAN parser 108 is the UNDERSTAND static code analysis tool produced by SCIENTIFIC TOOLWORKS, INC. (also known as SCITOOLS). An example of the DSM representation generation tool 110 is LATTIX LDM from LATTIX, INC. In this case, the term LDM may refer to lightweight dependency models. Other implementations of the FORTRAN parser 108 and/or the DSM representation generation tool 110 may be contemplated by one skilled in the art.

The FORTRAN parser 108 may receive as input a FORTRAN application 112. The FORTRAN parser 108 may disassemble the FORTRAN application 112 into its basic elements that make up a system structure 114. For example, the system structure 114 may include FORTRAN modules, source files, subroutines, functions, common blocks, variables of the FORTRAN application 112.

The DSM representation generation tool 110 may receive as input the system structure 114, identify dependencies between the elements in the system structure 114, and generate a DSM representation 116 that represents the elements and their dependencies. A dependency between two elements may be identified when one element uses another element. For example, a dependency may exist between a first subroutine and a second subroutine when the first subroutine calls the second subroutine. A dependency between two elements may also be identified when one element contains another element. For example, a dependency may exist between a subroutine and a common block when the subroutine contains the common block. As used herein, a first element may be referred to as having a "dependency with" a second element when the first element uses or contains the second element.

The DSM representation 116 may include a graphical representation of the elements of the FORTRAN application 112. The DSM representation 116 may be configured as a square matrix having multiple rows, multiple columns, and multiple cells. Each of the cells may correspond to one of the rows and one of the columns. Each row may be labeled and correspond to an element or a group of elements of the FORTRAN application 112. Each column may be labeled and also correspond to an element or group of elements of the FORTRAN application 112. A given element or group of elements may be nested such that expanding the element or group of elements results in the display of the nested elements.

Figure 2:
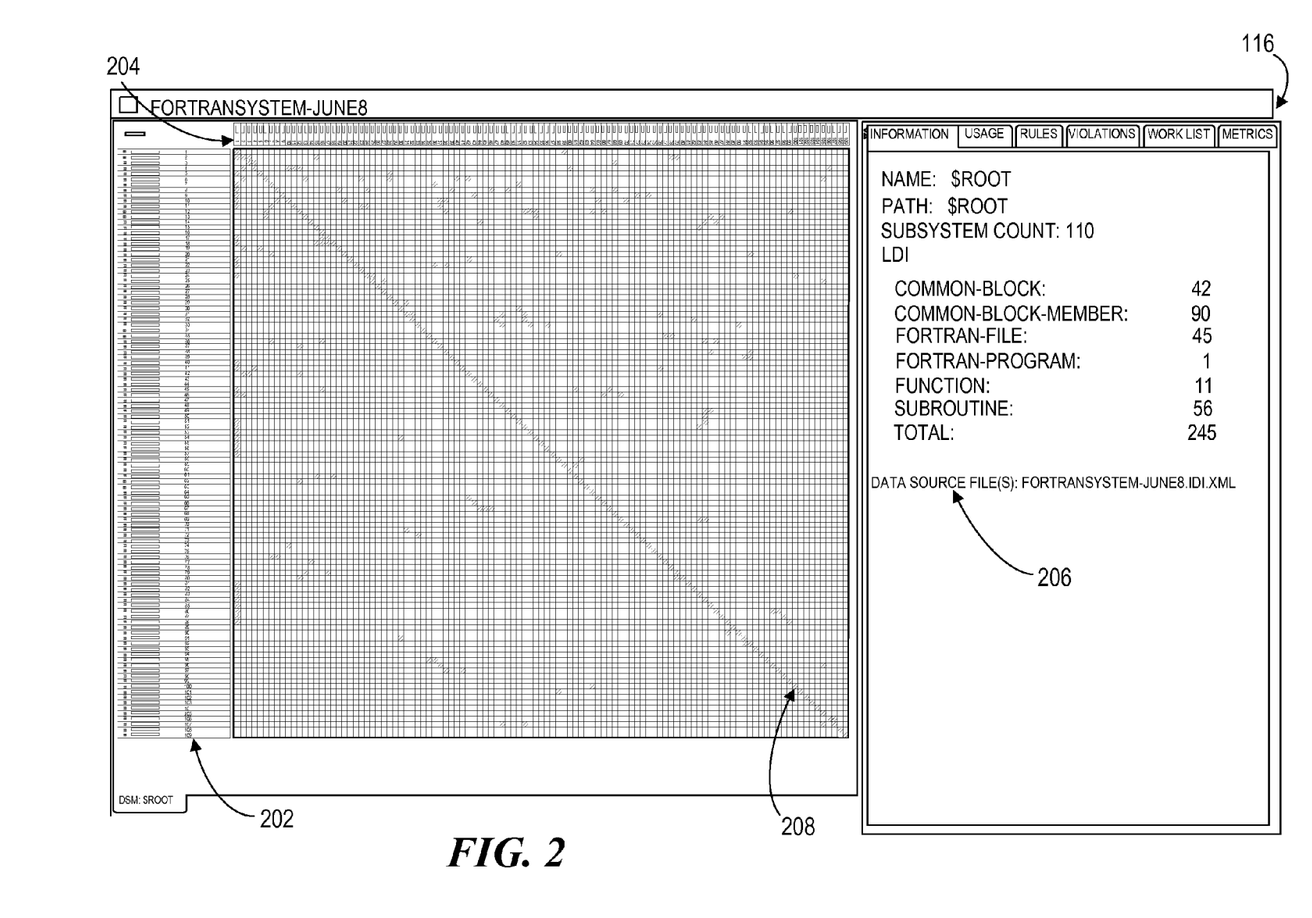
FIG. 2 is a screen display diagram illustrating an example implementation of the DSM representation, in accordance with embodiments presented herein.

The rows and the columns may be arranged according to the same order of the elements. As a result, each diagonal cell of the DSM representation 116 may correspond to the same element along the row and along the column. Each off-diagonal cell in the DSM representation 116 may indicate whether a dependency exists between the element represented by the corresponding column and the element represented by the corresponding row. The DSM representation 116 may reflect the raw data of the FORTRAN application 112 extracted by the DSM generation module 102. As a result, the elements may not be arranged, segregated, or grouped in a manner that enables meaningful analysis of the FORTRAN application 112. An example of the DSM representation 116 is illustrated in FIG. 2, which is described below.

The DSM analysis module 104 may receive as input the DSM representation 116. The DSM analysis module 104 may include a partitioning module 118, a clustering module 120, and a functional knowledge analysis module 122. The partitioning module 118 and the clustering module 120 may be configured to perform various aspects of a domain knowledge independent analysis on the DSM representation 116. The functional knowledge analysis module 122 may be configured to perform various aspects of a functional knowledge analysis on the DSM representation 116.

The partitioning module 118 may perform component-based partitioning on the DSM representation 116 in order to identify layers within the DSM representation 116. The layers may represent hierarchical arrangement of the groups of elements in the DSM representation 116. The partitioning module 118 may segregate the elements in the DSM representation 116 such that each layer contains one or more group of related elements based on their dependencies.

In some embodiments, the layers may include a top layer, a middle layer, and a bottom layer. Elements in the top layer may have a dependency with other elements (e.g., elements in the middle layer and the bottom layer), but no other elements may have a dependency with the elements in the top layer. Elements in the middle layer may have a dependency with other elements (e.g., elements in the bottom layer) and other elements (e.g., elements in the top layer) may have a dependency with the elements in the middle layer. Elements in the bottom layer may have no dependency with other elements, but other elements (e.g., elements in the top layer and the bottom layer) may have dependency with the elements in the bottom layer.

Figure 3:
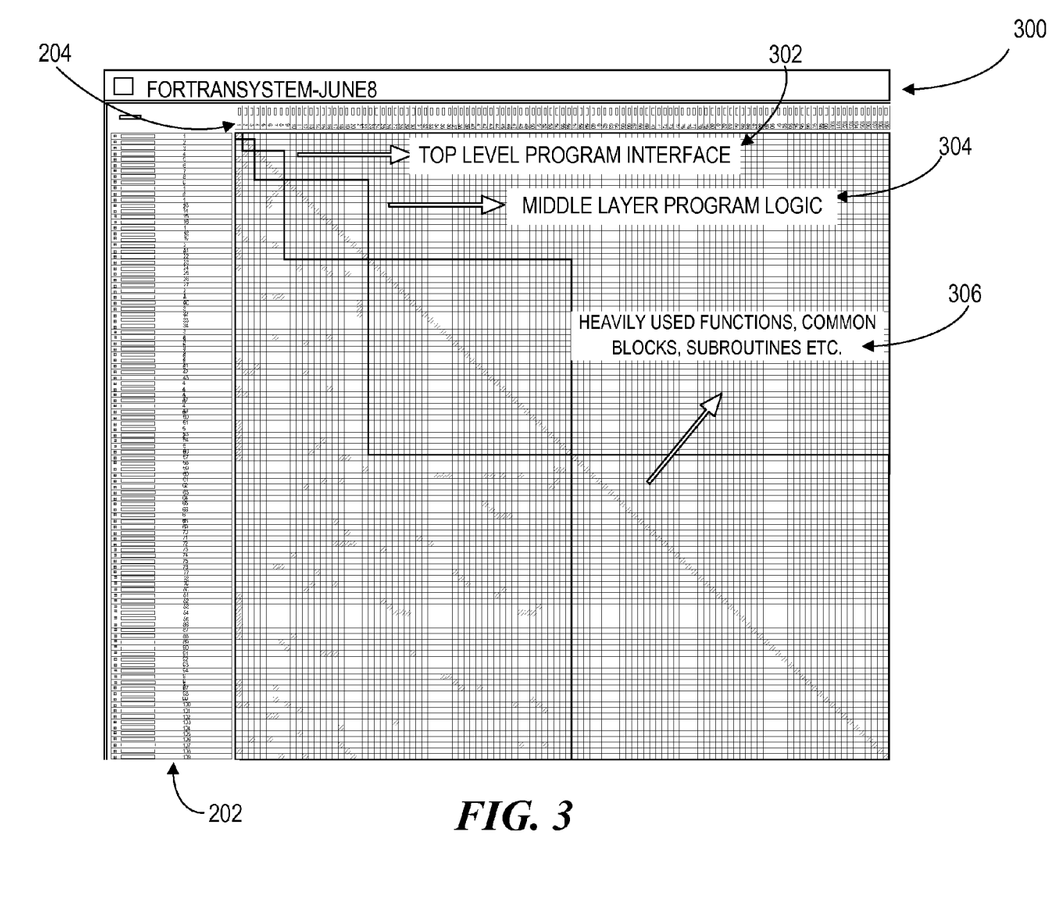
FIG. 3 is a screen display diagram of an example partitioned DSM representation after the partitioning module has partitioned the DSM representation, in accordance with embodiments presented herein.

The top layer, the middle layer, and the bottom layer may segregate distinct features of the FORTRAN application 112. The top layer may represent the top-level program interface. The middle layer may represent program logic. The bottom layer may represent functions, common blocks, subroutines, and the like. By segregating elements of the FORTRAN application 112 into these distinct layers, the partitioning module 118 can attain modularity in the FORTRAN application 112. In other embodiments, the partitioning module 118 may generate any number of layers. An example of the DSM representation 116 after component-based partitioning has been performed is illustrated in FIG. 3, which is described below.

The clustering module 120 may perform provider proximity clustering on the DSM representation 116 in order to identify clusters within the DSM representation 116. Provider proximity analysis may generally refer to a technique for determining the degree of closeness between any arbitrary element in the matrix with other elements in the matrix. Clustering based on this technique may identify closest neighbors based on dependency weights. In the DSM representation 116, each cluster identified using provider proximity analysis may contain elements down each column that have dependencies with other elements above on the same column. Because provider proximity analysis may not require or utilize domain knowledge, such analysis may be referred to as domain independent analysis.

Figure 4:
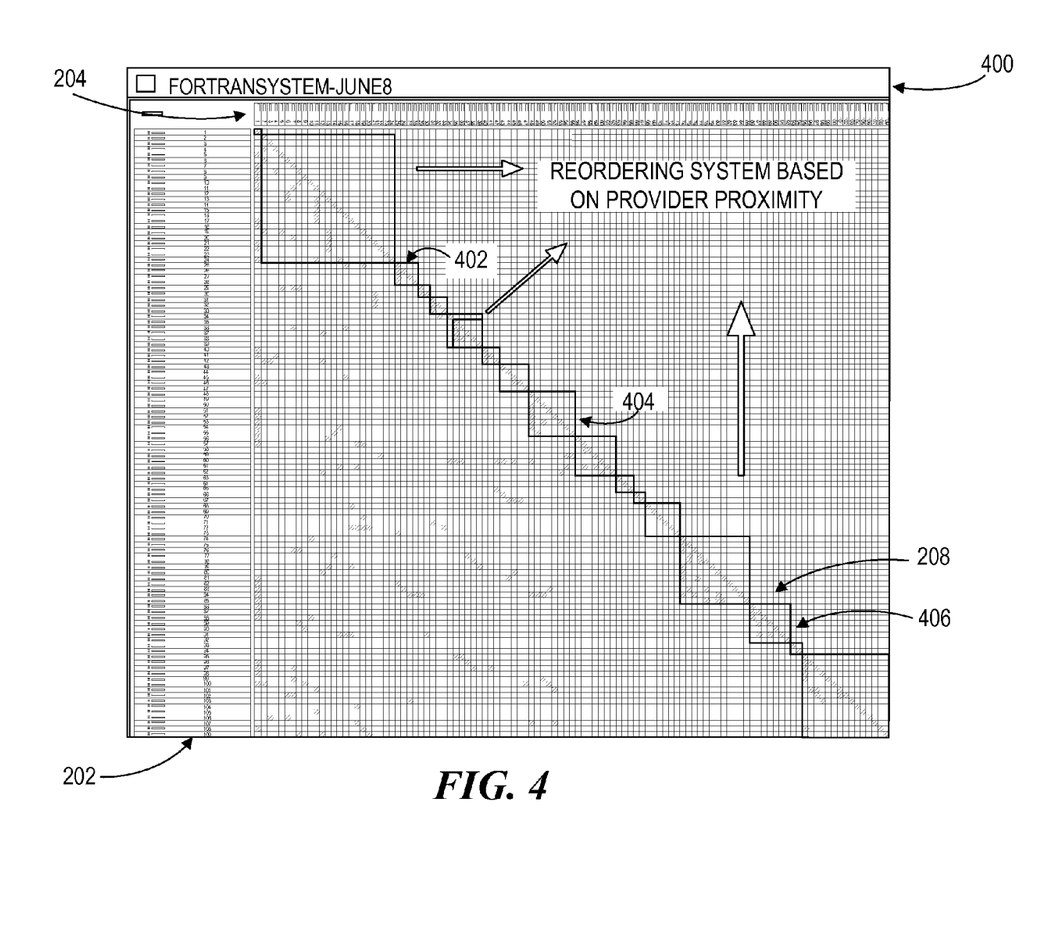
FIG. 4 is a screen display diagram of an example clustered DSM representation after the clustering module has identified clusters in the DSM representation, in accordance with embodiments presented herein.

Each cluster may include some combination of closely-connected elements, such as subroutines, functions, and/or common blocks. In particular, the clustering module 120 may cluster elements based on data affinities (e.g., common block affinities) and program logic affinities (e.g., subroutine affinities). Such affinities may be identified by clustering groups of elements down each column that have dependencies with other elements above on the same column. At least some of the elements in each cluster may have adjacent dependencies. An example of the DSM representation 116 after provider proximity clustering has been performed is illustrated in FIG. 4, which is described below.

Figure 5:
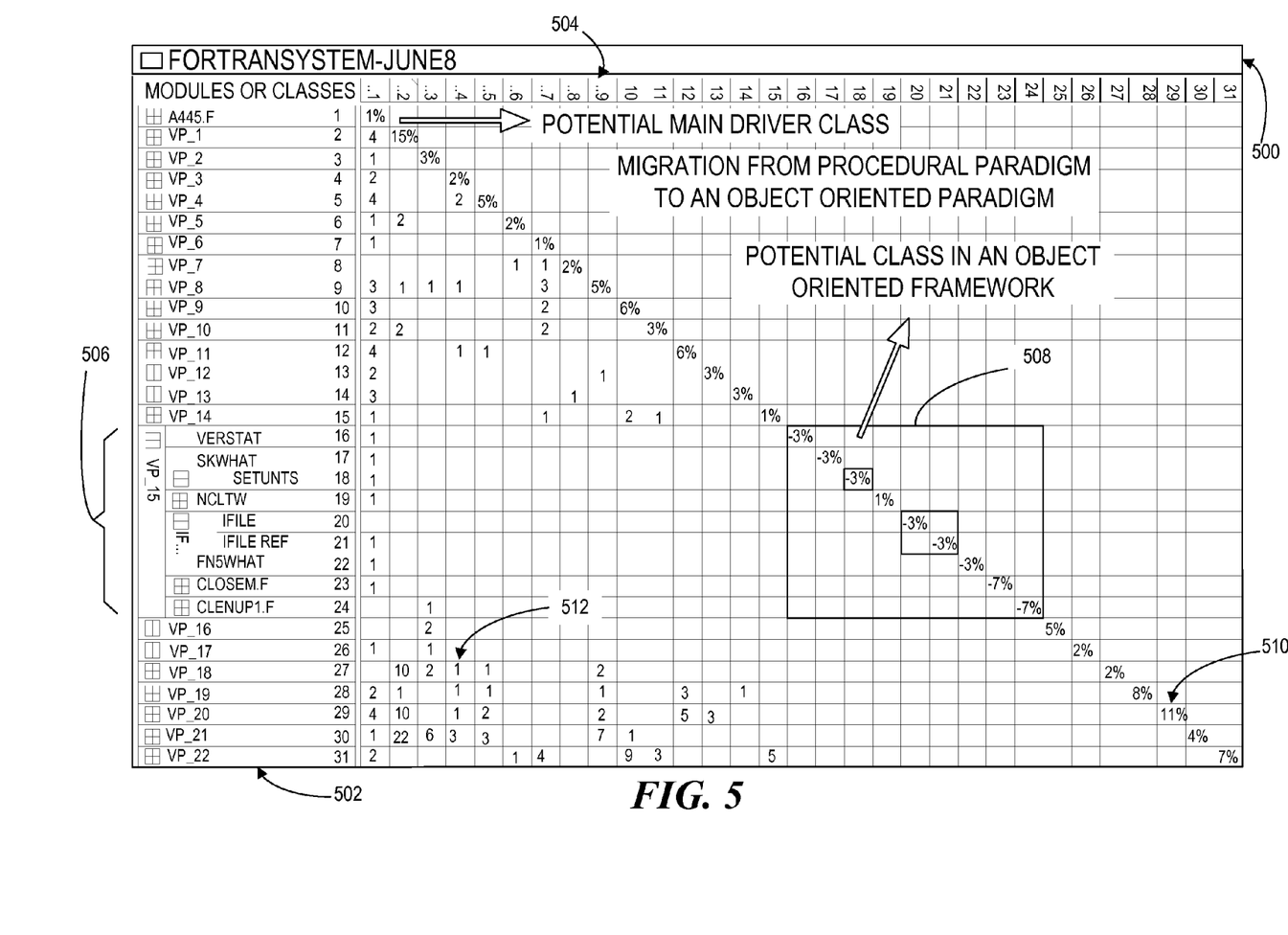
FIG. 5 is a screen display diagram illustrating an example implementation of the target system object model, in accordance with embodiments presented herein.

The functional knowledge analysis module 122 may generate a target system object model 124 based on the results of the component-based partitioning and/or the provider proximity clustering. The target system object model 124 may be generated by reorganizing the labels of the DSM representation 116 in accordance with the clusters identified by the clustering module 120. The labels may provide generic identifiers (e.g., cluster1, cluster2, etc.) or specific identifiers detailing a functionality or category of each cluster. The labels may be nested such that each label can be expanded to display elements contained within the corresponding cluster. The target system object model 124 may be arranged in a lower-triangular matrix in accordance with layers identified by the partitioning module 118 and/or the clusters identified by the clustering module 120. Because functional knowledge analysis may require or utilize domain knowledge, such analysis may be referred to as domain dependent analysis. An example of the target system object model 124 is illustrated in FIG. 5, which is described below.

Figure 6:
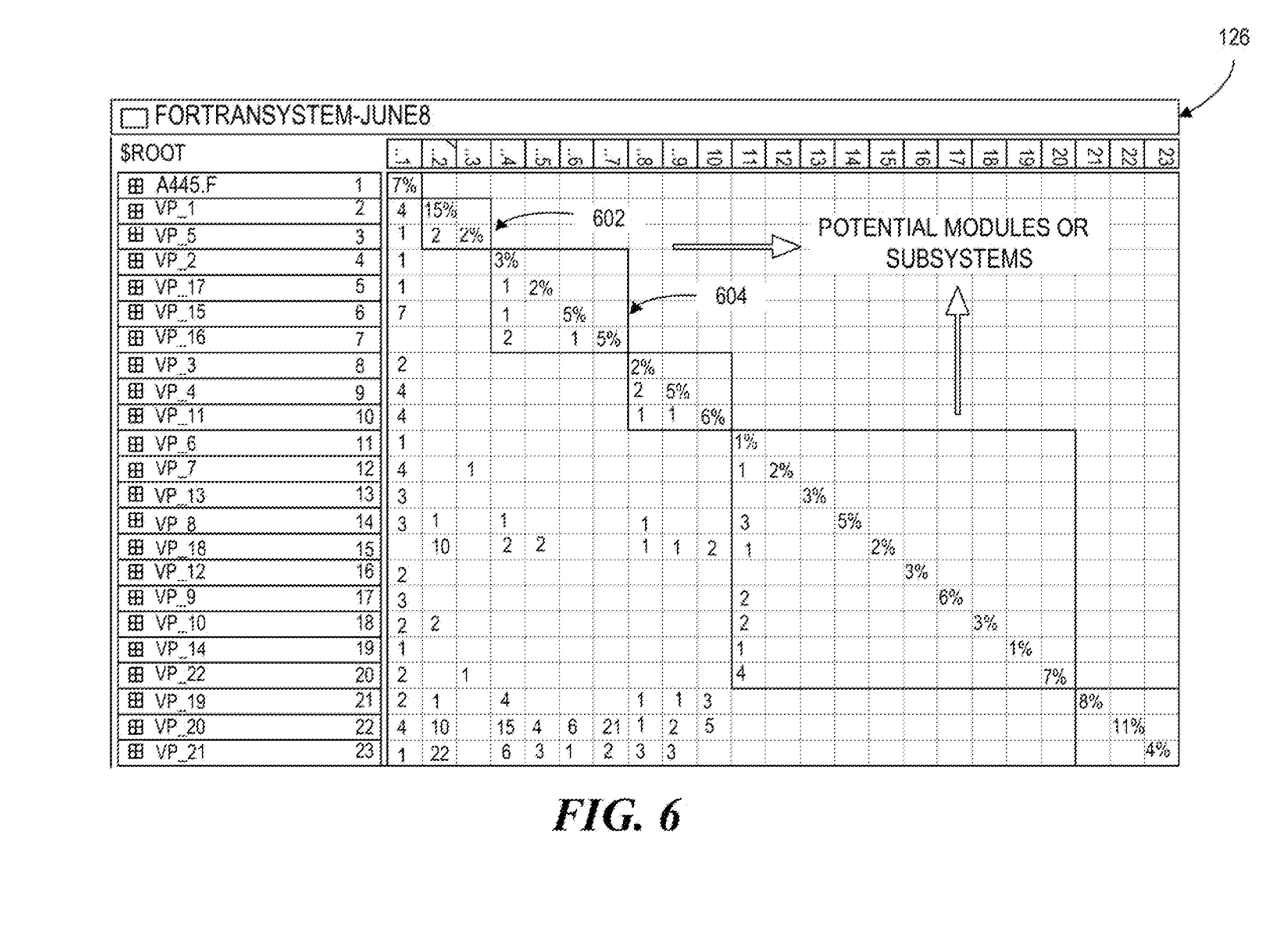
FIG. 6 is a screen display diagram illustrating an example implementation of the final object model, in accordance with embodiments presented herein.

Through an interface of the functional knowledge analysis module 122, a user can apply functional domain knowledge to validate each cluster of the elements as a potential class or a low-level module in an object-oriented framework. If the labels are generically named, the user may also revise the labels to more functional and meaningful names. Through the interface of the functional knowledge analysis module 122, the user may further aggregate multiple clusters into high-level modules, subsystems, or packages in an object-oriented framework, thereby creating a final object model 126. An example of the final object model 126 is illustrated in FIG. 6, which is described below.

Figure 7:
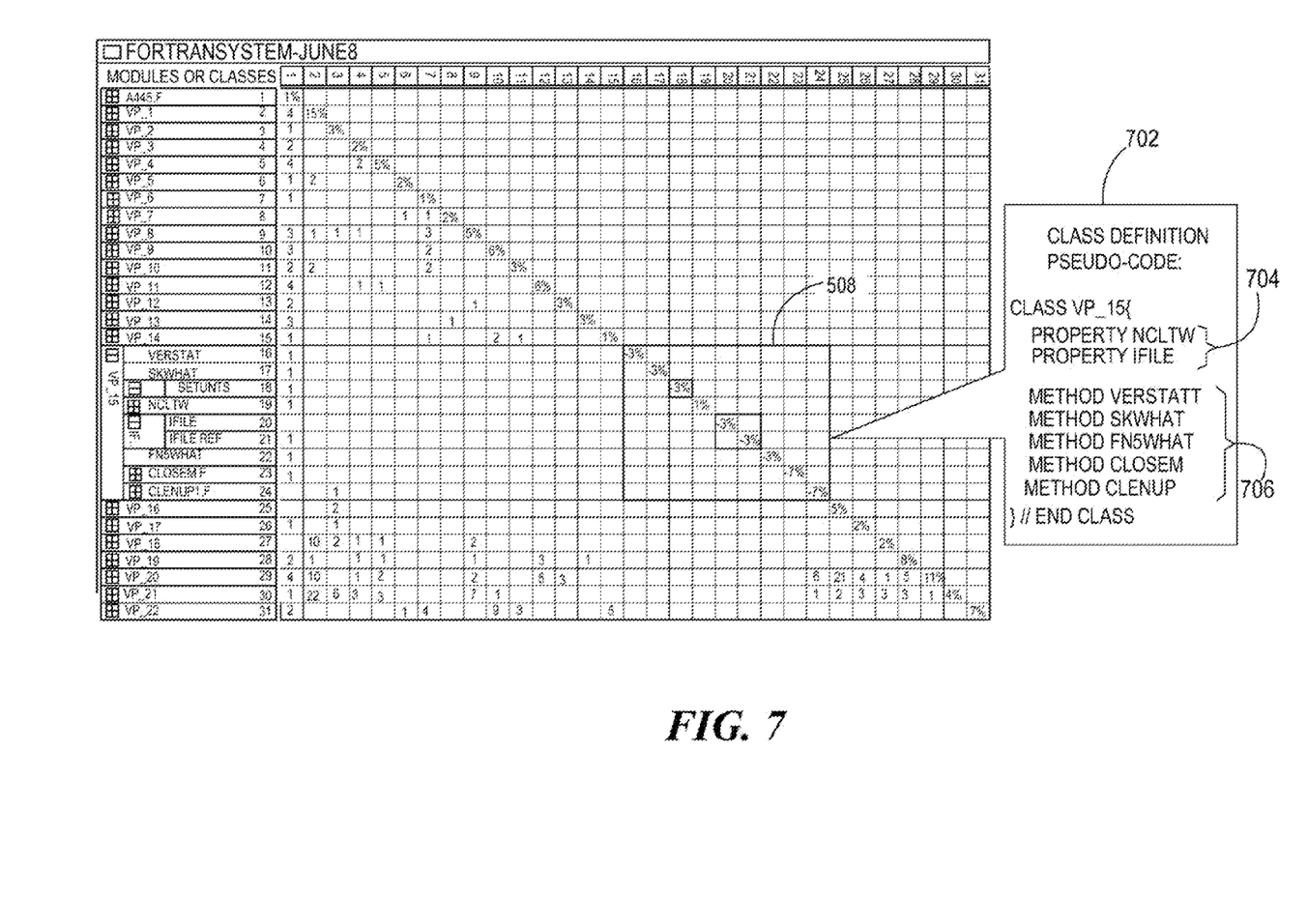
FIG. 7 is a screen display diagram illustrating an example implementation of a class definition of a cluster, in accordance with embodiments presented herein.

The target system mapping module 106 may receive as input the final object model 126. Each cluster in the final object model 126 may be a potential class or low-level module in an object-oriented framework. Some elements within a given cluster may form properties of the class. Some other elements within the cluster may form methods of the class. The target system mapping module 106 may perform lower-level analysis on each cluster in the final object model 126 to identify the properties and the methods of each cluster. The collection of properties and methods for a given cluster may form the class definition of the cluster. An example of a class definition corresponding to the target system object model 124 is illustrated in FIG. 7, which is described below.

Figure 8:
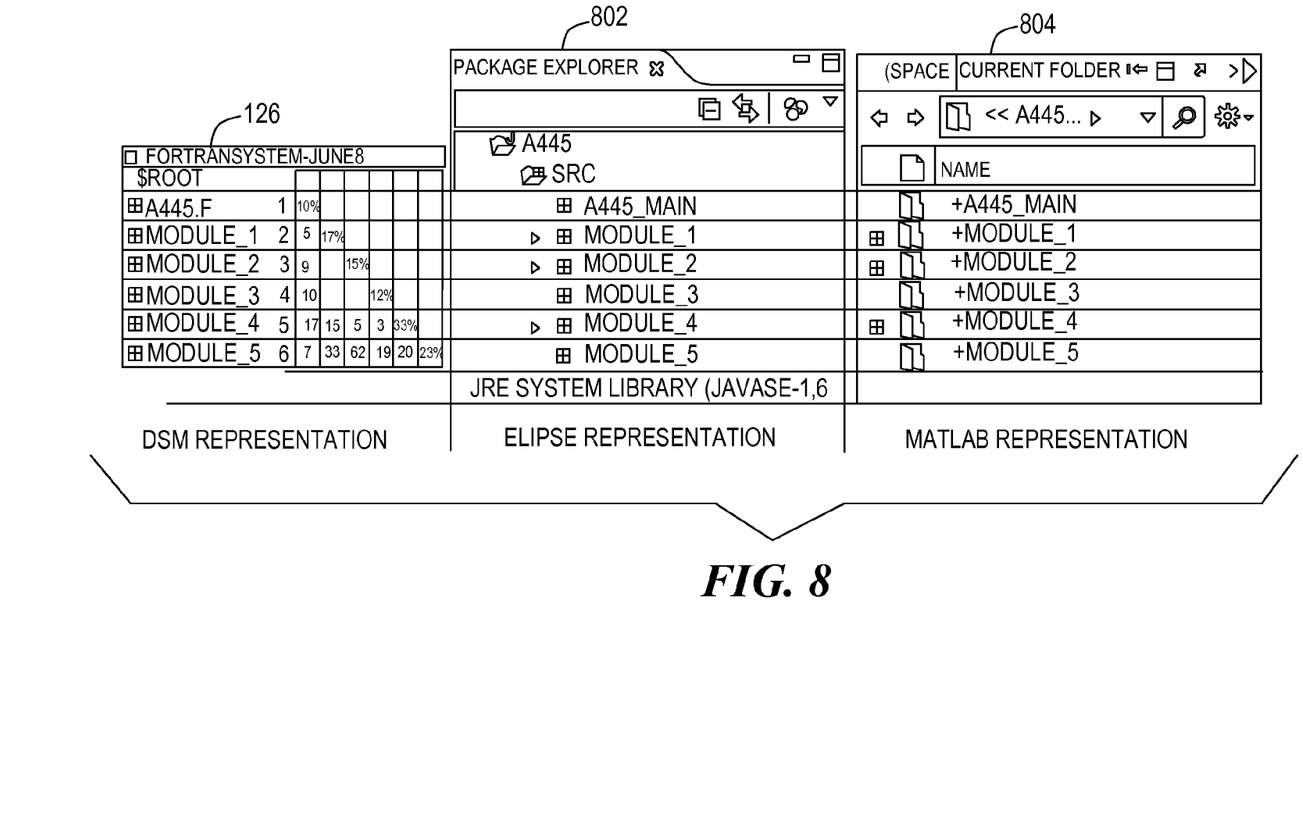
FIGS. 8 and 9 are screen display diagrams illustrating example implementations of the code skeleton representation, in accordance with embodiments presented herein.
Figure 9:
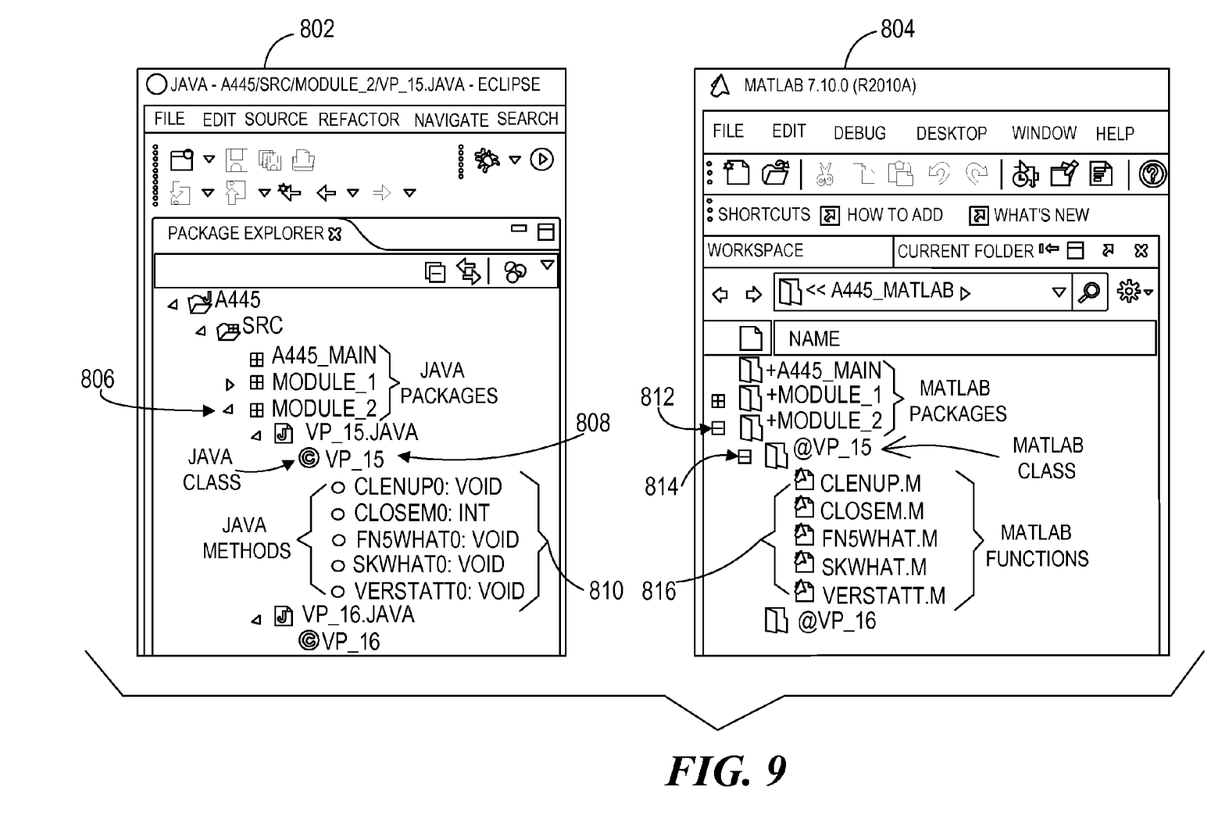

Utilizing the class definitions of each cluster, the target system mapping module 106 may map the high-level modules, subsystems, or packages in the final object model 126 to a code skeleton representation 128 of an object-oriented development environment. The code skeleton representation 128 may define packages, classes, methods, functions, and/or other structures that make up an object-oriented representation in the object-oriented development environment. These structures may vary between different object-oriented development environments. Some example object-oriented development environments may include ECLIPSE from THE ECLIPSE FOUNDATION, INC. and MATLAB from THE MATHWORKS, INC. (also known as MATHWORKS). Examples of the code skeleton representation 128 are illustrated in FIGS. 8 and 9, which are described below. A programmer may utilize the code skeleton representation 128 to effectively and efficiently translate the FORTRAN application to an object-oriented target language (e.g., JAVA).

FIG. 2 is a screen display diagram illustrating an example implementation of the DSM representation 116, in accordance with embodiments presented herein. As previously described, the DSM representation 116 may be generated by the FORTRAN parser 108 and the DSM representation generation tool 110 based on the FORTRAN application 112. The DSM representation 116 may include a set of rows 202 and a set of columns 204. The rows 202 and the columns 204 may include the same listing of elements in the same order. As illustrated in FIG. 2, an information window 206 specifies that the listing of elements includes forty-two common blocks, ninety common block members, forty-five FORTRAN files, one FORTRAN program, eleven functions, and fifty-six subroutines. That is, this combination of elements makes up the system structure 114 of the FORTRAN application 112.

The DSM representation 116 may include multiple cells. A shaded cell may indicate a dependency between a component in a corresponding row and a component in the corresponding column. As illustrated in FIG. 2, a shaded cell indicates that the component in the corresponding column has a dependency with the component in the corresponding row. In other embodiments, a shaded cell may indicate that the component in the corresponding row has a dependency with the component in the corresponding column. Diagonal cells 208 may be shaded because these cells correspond to the same element along the row and along the column. In other embodiments, other suitable highlights may be substituted for shading.

The DSM representation generation tool 110 may generate the DSM representation 116 based on the raw output from the FORTRAN parser 108. As a result, as illustrated in FIG. 2, the listing of elements may not be arranged, segregated, or grouped in a manner that enables meaningful interpretation of the data presented by the DSM representation 116. As described below, the DSM analysis module 104 may perform analysis on the DSM representation 116 to arrange, segregate, or group the listing of elements such that the DSM representation 116 can be more effectively interpreted.

FIG. 3 is a screen display diagram of an example partitioned DSM representation 300 after the partitioning module 118 has partitioned the DSM representation 116, in accordance with embodiments presented herein. The partitioning module 118 may perform component-based partitioning on the DSM representation 116 in order to identify a top layer 302, a middle layer 304, and a lower layer 306 in accordance with the dependencies between the elements. The partitioning module 118 may rearrange the listing of elements (in both the set of rows 202 and the set of columns 204) in the DSM representation 116 in accordance with the identified layers. Elements in the top layer 302 may have a dependency with other elements, but no other elements may have a dependency with the elements in the top layer. Elements in the middle layer may have a dependency with other elements, and other elements may have a dependency with the elements in the middle layer. Elements in the bottom layer may have no dependency with other elements, but other elements may have dependency with the elements in the bottom layer.

In some embodiments, the top layer 302 may represent a top-level program interface of the FORTRAN application 112. The middle layer 304 may represent program logic of the FORTRAN application 112. The lower layer 306 may represent functions, common blocks, and subroutines. The partitioned DSM representation 300 may be arranged in a lower-triangular matrix, as illustrated in FIG. 3.

FIG. 4 is a screen display diagram of an example clustered DSM representation 400 after the clustering module 120 has identified clusters in the DSM representation 116, in accordance with embodiments presented herein. The clustering module 120 may perform provider proximity clustering on the DSM representation 116 in order to identify clusters, such as clusters 402, 404, 406, within the DSM representation 116. The clustering module 120 may rearrange the listing of elements (in both the set of rows 202 and the set of columns 204) in the DSM representation 116 in accordance with the identified clusters.

Each cluster may include some combination of closely-connected elements, such as subroutines, functions, and/or common blocks. In particular, the clustering module 120 may cluster elements based on data affinities (e.g., common block affinities) and program logic affinities (e.g., subroutine affinities). Such affinities may be identified by clustering groups of elements having dependencies near the diagonal cells 208 of the DSM representation 116. For example, the clusters 402, 404, 406 show a concentration of clusters near the diagonal cells. The clustered DSM representation 400 may be arranged in a lower-triangular matrix, as illustrated in FIG. 4.

FIG. 5 is a screen display diagram illustrating an example implementation of the target system object model 124, in accordance with embodiments presented herein. As previously described, the functional knowledge analysis module 122 may generate the target system object model 124 based on the layers in the partitioned DSM representation 300 and/or the clusters in the clustered DSM representation 400. The target system object model 124 may include a set of rows 502 and a set of columns 504. The rows 502 and the columns 504 may include the same listing of clusters in the same order. The listing of clusters may correspond to the clusters identified by the clustering module 120. The listing of clusters may also be arranged in accordance with the layers identified by the partitioning module 118.

As illustrated in FIG. 5, the labels for the listing clusters are generic (e.g., vp_1, vp_2, vp_3, etc.). In other embodiments, the labels for the listing clusters may be specific identifiers detailing a functionality or category of each cluster. The labels may be nested such that each label can be expanded to display elements contained within the corresponding cluster. For example, as illustrated in FIG. 5, a label vp_15 has been expanded to display elements 506 that are nested within a cluster 508 corresponding to the label vp_15. Each of the clusters, including the cluster 508, may represent a potential class or low-level module in an object-oriented platform.

Each of multiple diagonal cells 510 may indicate a percentage with respect to a corresponding dependency. For example, the percentage may represent an amount of calls made by the given cluster or element along the row and along the column in relation to a total amount of calls made by all of the clusters or elements in the FORTRAN application 112. Each of multiple off-diagonal cells 512 may also indicate an integer with respect to a corresponding dependency. For example, the integer may specify a quantity of calls made from the cluster or element corresponding to the column to the cluster or element corresponding to the row. In other embodiments, the integer may specify a quantity of calls made from the cluster or element corresponding to the row to the cluster or element corresponding to the column.

FIG. 6 is a screen display diagram illustrating an example implementation of the final object model 126, in accordance with embodiments presented herein. As previously described, through an interface of the functional knowledge analysis module 122, a user can apply functional domain knowledge to validate each cluster of the elements as a potential class or a low-level module in an object-oriented framework. The user may further rearrange and aggregate multiple clusters into high-level modules, subsystems, or packages in an object-oriented framework. In one example, a first module 602 may include a cluster vp_1 and a cluster vp_5. In another example, a second module 604 may include a cluster vp_2, a cluster vp_17, a cluster vp_15, and a cluster vp_16.

FIG. 7 is a screen display diagram illustrating an example implementation of a class definition 702 of the cluster 508, in accordance with embodiments presented herein. As previously described, the target system mapping module 106 may perform a lower-level analysis on each cluster in the final object model 126 to identify properties and methods of each cluster. For example, FIG. 7 illustrates the class definition 702 of the cluster 508. The class definition 702 may include a set of properties 704 and a set of methods 706.

FIGS. 8 and 9 are screen display diagrams illustrating example implementations of the code skeleton representation 128, in accordance with embodiments presented herein. FIG. 8 illustrates an example implementation of the final object model 126. FIG. 8 also illustrates an ECLIPSE representation 802 mapped from the final object model 126 and a MATLAB representation 804 mapped from the final object model 126.

FIG. 9 illustrates an expansion of one of the modules in both the ECLIPSE representation 802 and the MATLAB representation 804. In the ECLIPSE representation 802, each module may represent a JAVA package. Each JAVA package may include one or more JAVA classes. Each JAVA class may include one or more JAVA methods. For example, a JAVA package 806 may be expanded to show a JAVA class 808, and the JAVA class may be expanded to show JAVA methods 810. In the MATLAB representation 804, each module may present a MATLAB package. Each MATLAB package may include one or more MATLAB classes. Each MATLAB class may include one or more MATLAB functions. For example, a MATLAB package 812 may be expanded to show a MATLAB class 814, and the MATLAB class 814 may be expanded to show MATLAB functions 816.

Figure 10:
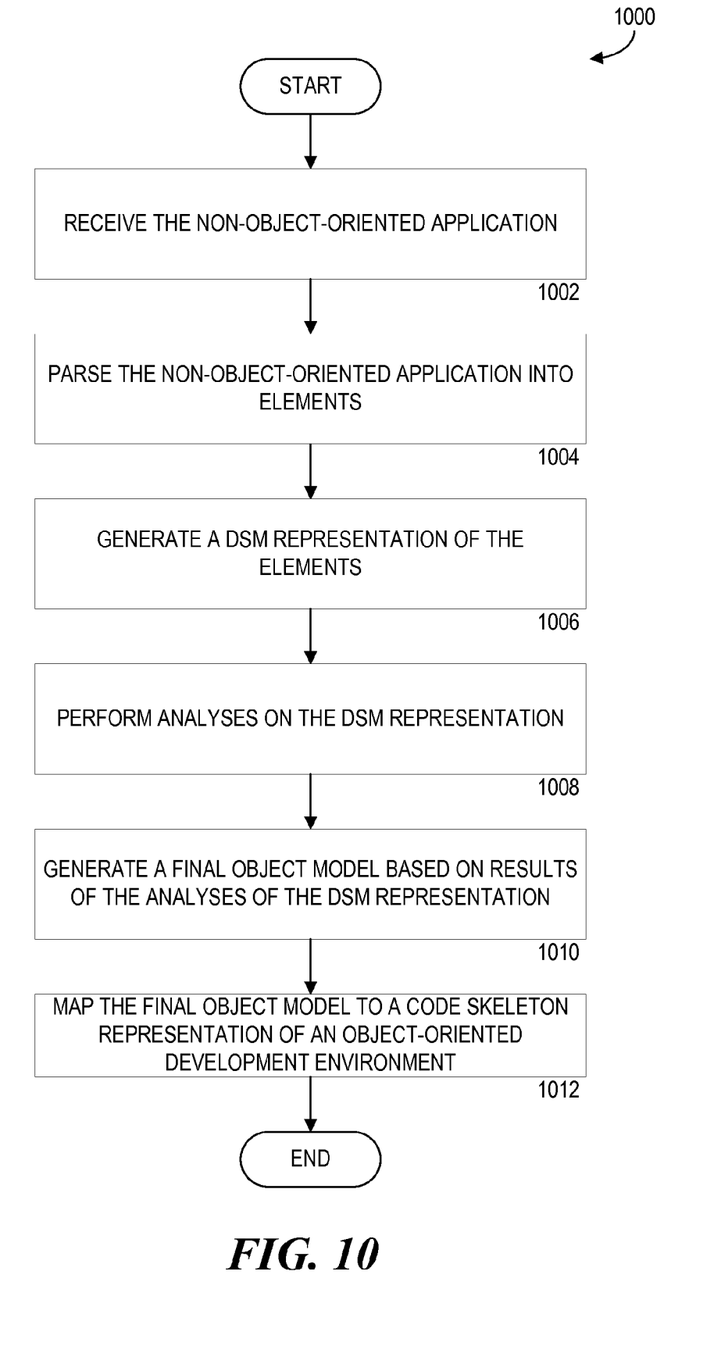
FIG. 10 is a flow diagram illustrating a method for migrating a non-object-oriented application to an object-oriented platform, in accordance with the embodiments presented herein.

Turn now to FIG. 10, additional details will be provided regarding embodiments presented herein for migrating a non-object-oriented application to an object-oriented platform. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 10 shows a routine 1000 for migrating a non-object-oriented application to an object-oriented platform. For example, the routine 500 may be utilized to migrate a FORTRAN application to a code skeleton representation of ECLIPSE or JAVA. In some embodiments, the routine 1000 may be performed by the DSM generation module 102, the DSM analysis module 104, and/or the target system mapping module 106 of the migration system 100.

The routine 1000 begins at operation 1002, where the migration system 100 may receive a non-object-oriented application. For example, the non-object-oriented application may be a FORTRAN application. After operation 1002, the routine 1000 may proceed to operation 1004.

At operation 1004, the migration system 100 may parse the non-object-oriented application into elements of the non-object-oriented application. For example, elements of FORTRAN application may include FORTRAN modules, source files, subroutines, functions, common blocks, and/or variables. After operation 1004, the routine 1000 may proceed to operation 1006.

At operation 1006, the migration system 100 may generate a DSM representation of the elements. The DSM representation may include a set of rows corresponding to an order of the elements, a set of columns corresponding to the order of the elements, and a set of cells. Each cell may correspond to one of the rows and one of the columns. After operation 1006, the routine 1000 may proceed to operation 1008.

At operation 1008, the migration system 100 may perform various analyses on the DSM representation. Such analyses may include operations performed by the DSM analysis module 104, as previously described. In particular, the DSM analysis module 104 may perform domain independent analysis (e.g., partitioning or clustering) and domain dependent analysis (e.g., reorganizing labels in the DSM representation to align with the business function of the application). After operation 1008, the routine 1000 may proceed to operation 1010.

At operation 1010, the migration system 100 may generate a final object model based on results of the analyses of the DSM representation. The migration system 100 may generate a target system object model based on the partitions and/or the clusters. The migration system 100 may identify packages in the target system object model by aggregating groups of clusters. The migration system 100 may generate the final object model based on the packages identified in the target system object model. After operation 1010, the routine 1000 may proceed to operation 1012.

At operation 1012, the migration system may map the final object model to a code skeleton representation of an object-oriented development environment. Some example object-oriented development environments may include ECLIPSE and MATLAB. In ECLIPSE, the code skeleton representation may define JAVA packages, JAVA classes, and JAVA methods. In MATLAB, the code skeleton representation may define MATLAB packages, MATLAB classes, and MATLAB functions. After operation 1012, the routine 1000 may either repeat (e.g., periodically, continuously, or on demand as needed) or terminate.

Figure 11:
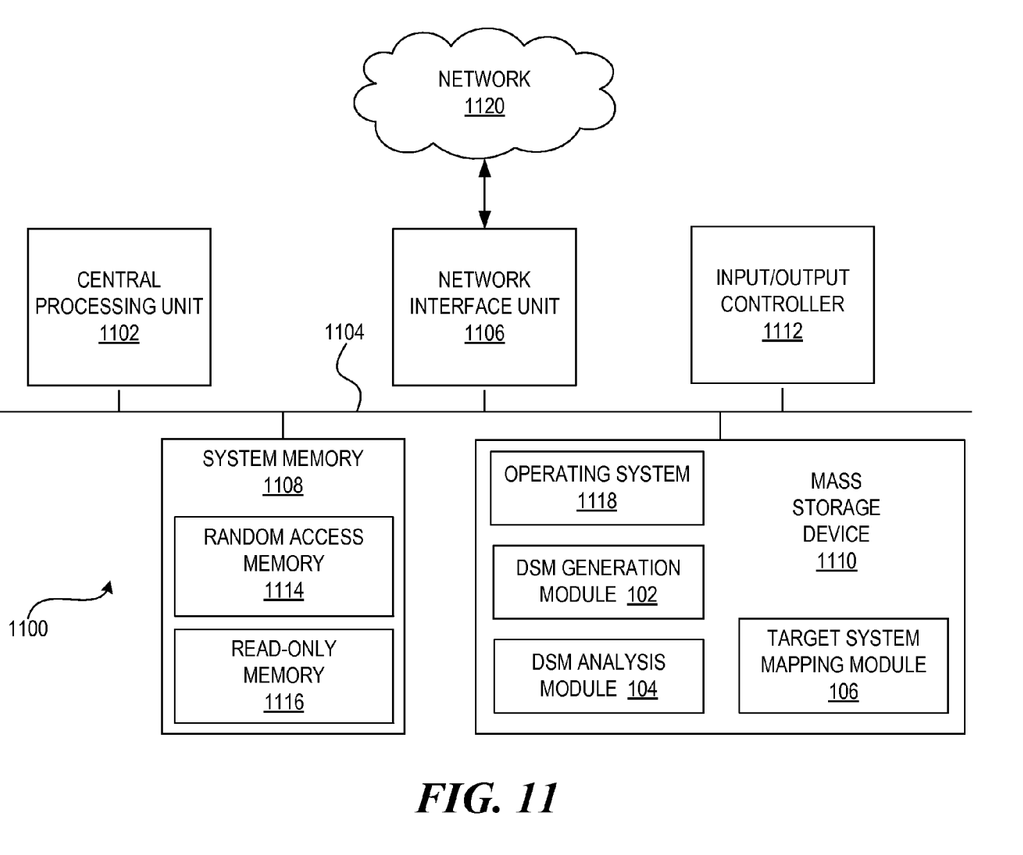
FIG. 11 is a block diagram showing an illustrative computer hardware and software architecture for a computing system capable of implementing aspects of the embodiments presented herein.

FIG. 11 shows an illustrative computer 1100 capable of executing the software elements described herein for migrating a non-object-oriented application to an object-oriented platform. The computer 1100 may be embodied in single computing device or in a combination of one or more processing units, storage units, and/or other computing devices. The computer 1100 includes one or more central processing units 1102 ("CPUs"), a system memory 1108, including a random access memory 1114 ("RAM") and a read-only memory 1116 ("ROM"), and a system bus 1104 that couples the memory to the CPUs 1102.

The CPUs 1102 may be standard programmable processors that perform arithmetic and logical operations necessary for the operation of the computer 1100. The CPUs 1102 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 1100 also includes a mass storage device 1110. The mass storage device 1110 may be connected to the CPUs 1102 through a mass storage controller (not shown) further connected to the bus 1104. The mass storage device 1110 and its associated computer-readable media provide non-volatile, non-transitory storage for the computer 1100. The mass storage device 1110 may store an operating system 1118, as well as specific application modules or other program modules, such as the DSM generation module 102, the DSM analysis module 104, and the target system mapping module 106 described above in regard to FIG. 1. The mass storage device 1110 may also store data collected or utilized by the various systems and modules, such as the DSM representation 116, the final object model 126, and the code skeleton representation 128.

The computer 1100 may store programs and data on the mass storage device 1110 by transforming the physical state of the mass storage device to reflect the information being stored. The specific transformation of physical state may depend on various factors, in different implementations of this disclosure. Examples of such factors may include, but are not limited to, the technology used to implement the mass storage device 1110, whether the mass storage device is characterized as primary or secondary storage, and the like. For example, the computer 1100 may store information to the mass storage device 1110 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete element in a solid-state storage device. Other transformations of physical media are possible without departing from the scope and spirit of the present description, with the foregoing examples provided only to facilitate this description. The computer 1100 may further read information from the mass storage device 1110 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer media that can be accessed by the computer 1100. Computer-readable media includes communication media, such as signals, and computer-readable storage media. By way of example, and not limitation, computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer 1100. According to one embodiment, the computer 1100 may have access to computer-readable storage media storing computer-executable instructions that, when executed by the computer, perform the routine 500 for displaying temporally based weather symbology on a graphical map display, as described above in regard to FIG. 5.

According to various embodiments, the computer 1100 may operate in a networked environment using logical connections to remote computers through a network, such as the network 1120. The computer 1100 may connect to the network 1120 through a network interface unit 1106 connected to the bus 1104. It should be appreciated that the network interface unit 1106 may also be utilized to connect to other types of networks and remote computer systems. The computer 1100 may also include an input/output controller 1112 for providing output to a display device, such as a computer monitor, a printer, or other type of output device. The input/output controller 1112 may further receive input from devices, such as a keyboard, mouse, electronic stylus, touch screen, and the like. It will be further appreciated that the computer 1100 may not include all of the elements shown in FIG. 11, may include other elements that are not explicitly shown in FIG. 11, or may utilize an architecture completely different than that shown in FIG. 11.

Based on the foregoing, it should be appreciated that technologies for migrating a non-object-oriented application to an object-oriented platform are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for migrating a non-object-oriented application to an object-oriented platform, the method comprising:
    receiving the non-object-oriented application;
    parsing the non-object-oriented application into elements of the non-object-oriented application;
    generating a design structure matrix (DSM) representation of the elements comprising:
        identifying a plurality of partitions in the DSM representation by performing component-based partitioning on the DSM representation;
        identifying a plurality of clusters in the DSM representation by performing provider proximity clustering on the DSM representation;
        generating a target system object model based on the plurality of partitions and the plurality of clusters;
        identifying a plurality of packages in the target system object model by aggregating groups of the plurality of clusters; and
    generating a final object model based on the plurality of packages identified in the target system object model and the DSM representation; and
    mapping, by a computer, the final object model to a code skeleton representation of an object-oriented development environment.

2. The method of claim 1, wherein receiving the non-object-oriented application comprises receiving a formula translation (FORTRAN) application.

3. The method of claim 2, wherein parsing the non-object-oriented application into elements comprises:
    parsing the FORTRAN application into at least one of FORTRAN modules, source files, subroutines, functions, common blocks, and variables.

4. The method of claim 1, wherein generating the DSM representation of the elements comprises:
    generating the DSM representation comprising a plurality of rows corresponding to an order of the elements, a plurality of columns corresponding to the order of the elements, and a plurality of cells, each of the plurality of cells corresponding to one of the plurality of rows and one of the plurality of columns.

5. The method of claim 4, the method further comprising:
    highlighting a cell in the plurality of cells when a first element corresponding to the cell has a dependency with a second element corresponding to the cell.

6. The method of claim 5, wherein highlighting the cell in the plurality of cells when the first element corresponding to the cell has the dependence with the second element corresponding to the cell comprises:
    highlighting the cell in the plurality of cells when the first element uses the second element.

7. The method of claim 5, wherein highlighting the cell in the plurality of cells when the first element corresponding to the cell has the dependence with the second element corresponding to the cell comprises:
    highlighting the cell in the plurality of cells when the first element contains the second element.

8. The method of claim 1, wherein identifying the plurality of partitions in the DSM representation comprises:
    identifying a top layer representing a top-level program interface of the non-object-oriented application, a middle layer representing a program logic of the non-object-oriented application, and a bottom layer representing functions, common blocks, and subroutines of the non-object-oriented application in the DSM representation.

9. The method of claim 1, wherein identifying the plurality of clusters in the DSM representation by performing provider proximity clustering on the DSM representation comprises:
    clustering groups of the elements down one or more columns that have dependencies with other elements above on the same column.

10. A computer-readable storage medium comprising computer-executable instructions that, when executed by a computer, cause the computer to:
    receive a non-object-oriented application;
    parse the non-object-oriented application into elements of the non-object-oriented application;
    generate a design structure matrix (DSM) representation of the elements comprising a plurality of rows corresponding to an order of the elements, a plurality of columns corresponding to the order of the elements, and a plurality of cells, each of the plurality of cells corresponding to one of the plurality of rows and one of the plurality of columns;
    highlight a cell in the plurality of cells when a first element corresponding to the cell has a dependency with a second element corresponding to the cell;

generate a final object model based on the DSM representation by:
  identifying a plurality of partitions in the DSM representation by performing component-based partitioning on the DSM representation;
  identifying a plurality of clusters in the DSM representation by performing provider proximity clustering on the DSM representation;
  generating a target system object model based on the plurality of partitions and the plurality of clusters;
  identifying a plurality of packages in the target system object model by aggregating groups of the plurality of clusters; and
  generating the final object model based on the plurality of packages identified in the target system object model; and
map the final object model to a code skeleton representation of object-oriented development environment.

11. The computer-readable storage medium of claim 10, wherein the non-object-oriented application comprises a formula translation (FORTRAN) application; and wherein the elements comprise at least one of FORTRAN modules, source files, subroutines, functions, common blocks, and variables.

12. The computer-readable storage medium of claim 10, wherein a first cell in the plurality of cells is highlighted when the first element uses the second element; and wherein a second cell in the plurality of cells is highlighted when the first element contains the second element.

13. The computer-readable storage medium of claim 10, wherein the plurality of partitions comprises a top layer representing a top-level program interface of the non-object-oriented application, a middle layer representing a program logic of the non-object-oriented application, and a bottom layer representing functions, common blocks, and subroutines of the non-object-oriented application.

14. The computer-readable storage medium of claim 10, wherein the plurality of clusters comprises groups of the elements down one or more columns that have dependencies with other elements above on the same column.

15. A system for migrating a non-object-oriented application to an object-oriented platform, the system comprising:
  a processor;
  a memory communicatively coupled to the processor; and
  a program module which executes in the processor from the memory and which, when executed by the processor, causes the processor to:
receive a formula translation (FORTRAN) application;
parse the FORTRAN application into elements including FORTRAN modules, source files, subroutines, functions, common blocks, and variables;
generate a design structure matrix (DSM) representation of the elements;
generate a final object model based on the DSM representation by:
  identifying a plurality of partitions in the DSM representation by performing component-based partitioning on the DSM representation;
  identifying a plurality of clusters in the DSM representation by performing provider proximity clustering on the DSM representation;
  generating a target system object model based on the plurality of partitions and the plurality of clusters;
  identifying a plurality of packages in the target system object model by aggregating groups of the plurality of clusters; and
  generating the final object model based on the plurality of packages identified in the target system object mode; and
map the final object model to a code skeleton representation of an object-oriented development environment.

\* \* \* \* \*